United States Patent
Adams

(10) Patent No.: US 9,327,634 B2
(45) Date of Patent: May 3, 2016

(54) CARGO DUNNAGE DEVICE

(71) Applicant: Fontaine Engineered Products, Inc., Jasper, AL (US)

(72) Inventor: James H. Adams, Jasper, AL (US)

(73) Assignee: Fontaine Engineered Products, Inc., Jasper, AL (US)

( * ) Notice: Subject to any disclaimer, the term of this patent is extended or adjusted under 35 U.S.C. 154(b) by 0 days.

(21) Appl. No.: 14/184,512

(22) Filed: Feb. 19, 2014

(65) Prior Publication Data

US 2014/0234048 A1    Aug. 21, 2014

Related U.S. Application Data

(60) Provisional application No. 61/766,630, filed on Feb. 19, 2013.

(51) Int. Cl.
*B60P 7/08* (2006.01)
*B60P 7/12* (2006.01)

(52) U.S. Cl.
CPC *B60P 7/12* (2013.01); *B60P 7/0892* (2013.01)

(58) Field of Classification Search
CPC ........ B60P 3/035; B60P 3/077; B60P 7/0892; B60P 7/12; B60P 7/135; B60T 3/00
USPC .......... 410/30, 36, 39, 40, 41, 49, 50, 87, 90, 410/91, 94, 120, 121, 154, 155; 206/453, 206/593, 586; 188/32
See application file for complete search history.

(56) References Cited

U.S. PATENT DOCUMENTS

| | | | |
|---|---|---|---|
| 3,557,909 A * | 1/1971 | Neumann | |
| 3,630,487 A * | 12/1971 | Wechter, Jr. | |
| 4,310,271 A * | 1/1982 | Canellis et al. | 410/13 |
| 5,927,915 A * | 7/1999 | Grove, Sr. | 410/49 |
| 6,439,543 B1 * | 8/2002 | Peckham | |
| 7,571,953 B2 | 8/2009 | Adams | |
| 8,057,143 B2 | 11/2011 | Adams | |
| 2012/0099941 A1 * | 4/2012 | Larsh et al. | 410/154 |
| 2014/0161555 A1 | 6/2014 | Adams | |

* cited by examiner

*Primary Examiner* — Stephen Gordon
(74) *Attorney, Agent, or Firm* — Andrus Intellectual Property Law, LLP

(57) ABSTRACT

A dunnage device for securing a load to a cargo deck includes an elongated tubular body having an interior space. A transverse wall is positioned within the interior space of the tubular body. The elongated tubular body is adapted to be positioned on the cargo deck.

9 Claims, 8 Drawing Sheets

CARGO DUNNAGE DEVICE

CLAIM OF PRIORITY

This application claims priority to U.S. Provisional Patent Application No. 61/766,630, filed Feb. 19, 2013, the contents of which are hereby incorporated by reference.

FIELD OF THE INVENTION

The present invention relates generally to cargo transportation systems, vehicles and/or devices and, more specifically, to a cargo dunnage device for cargo transportation systems, vehicles and/or devices.

DETAILED DESCRIPTION OF EMBODIMENTS

Figure 1:
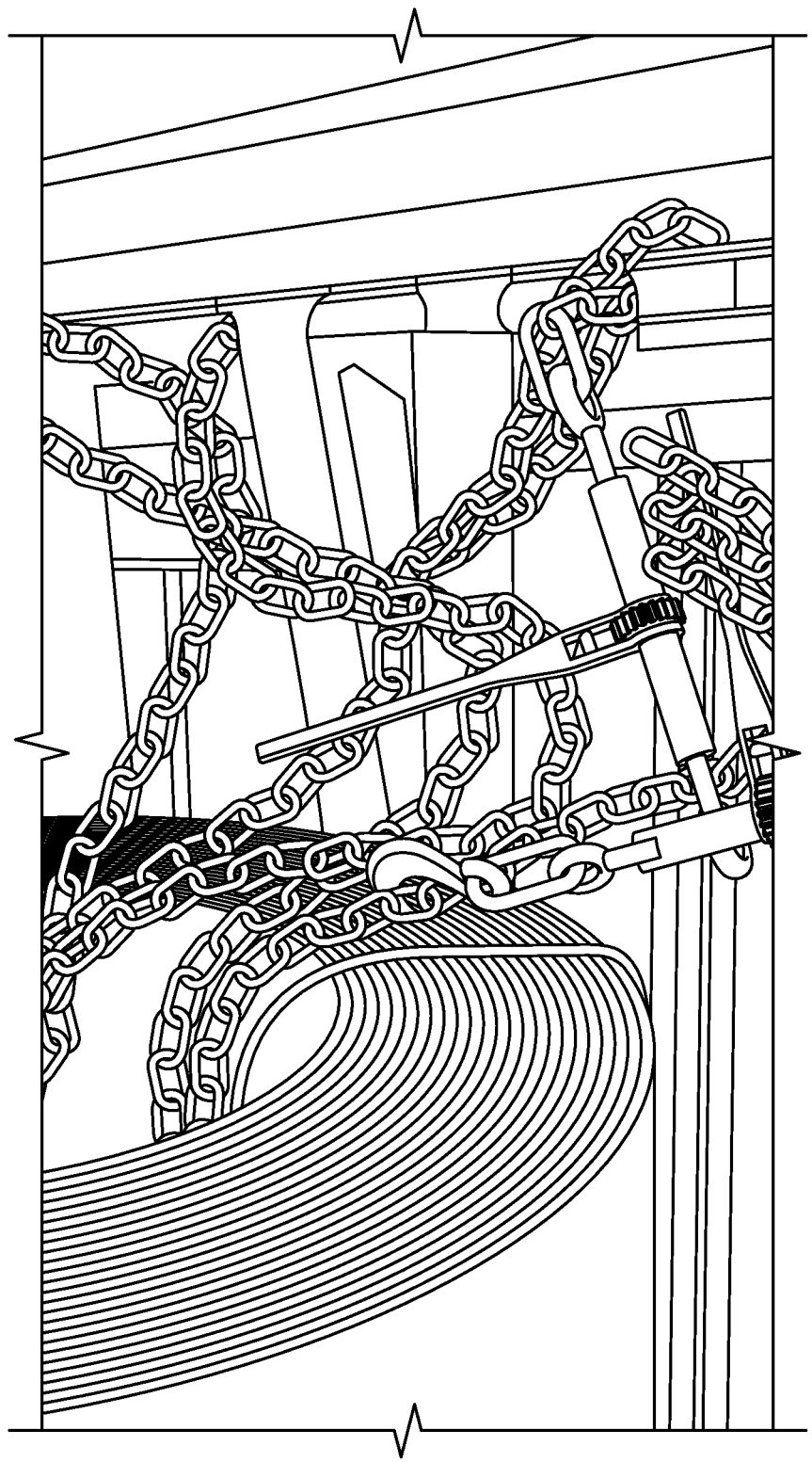
FIG. 1 is a perspective view of a prior art wood cargo dunnage system.

As illustrated in FIG. 1, cargo is typically supported and secured on the cargo deck of a trailer, intermodal flat rack or other cargo transport device by wooden dunnage and chains or straps. Such an approach is often time consuming and, if not done properly, may result in the cargo becoming unsecured during transport. In addition, such an arrangement requires several different parts or components that may become lost or must be stored.

Figure 2:
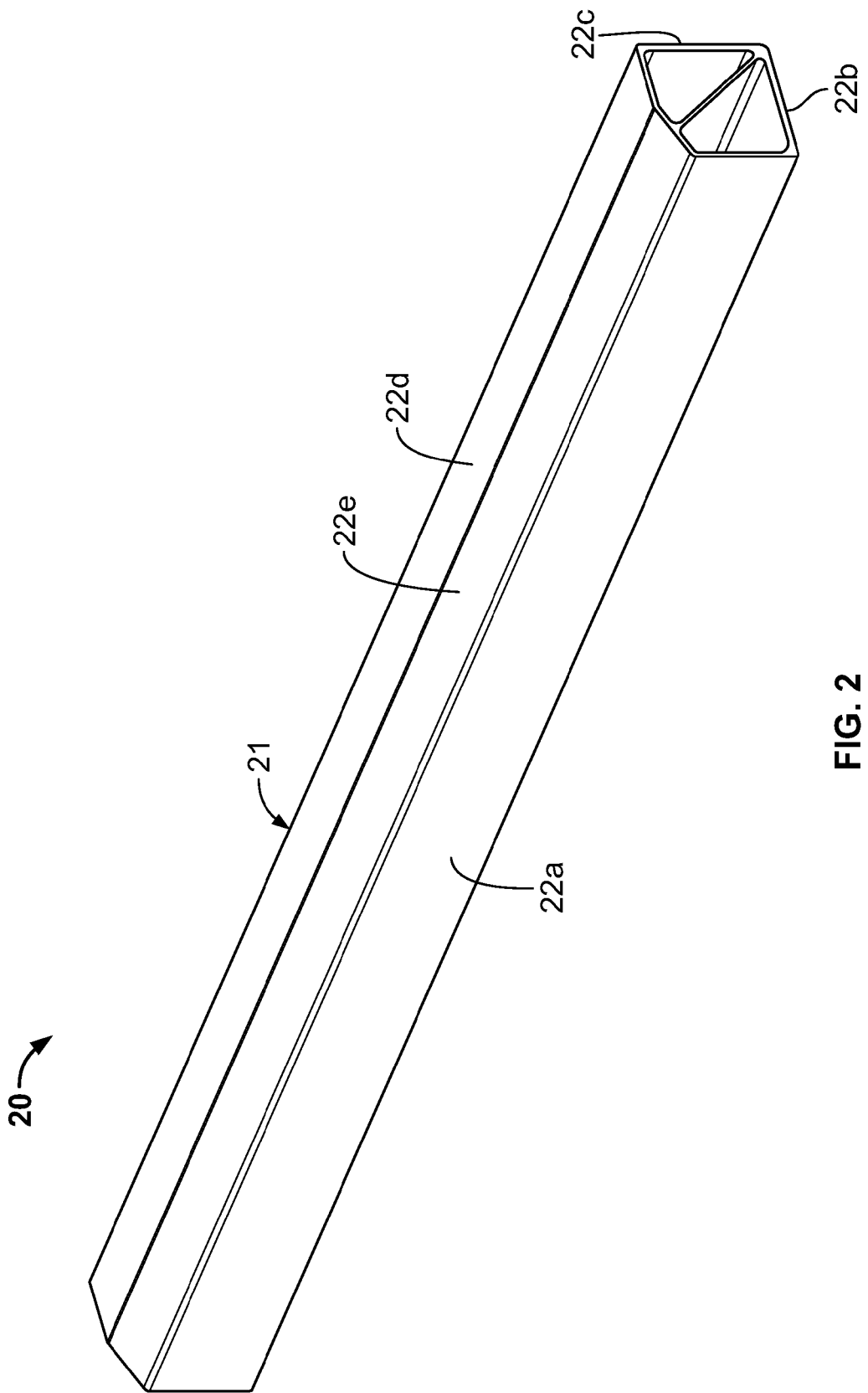
FIG. 2 is a perspective views of a first embodiment of the cargo dunnage device of the present invention.
Figure 3:
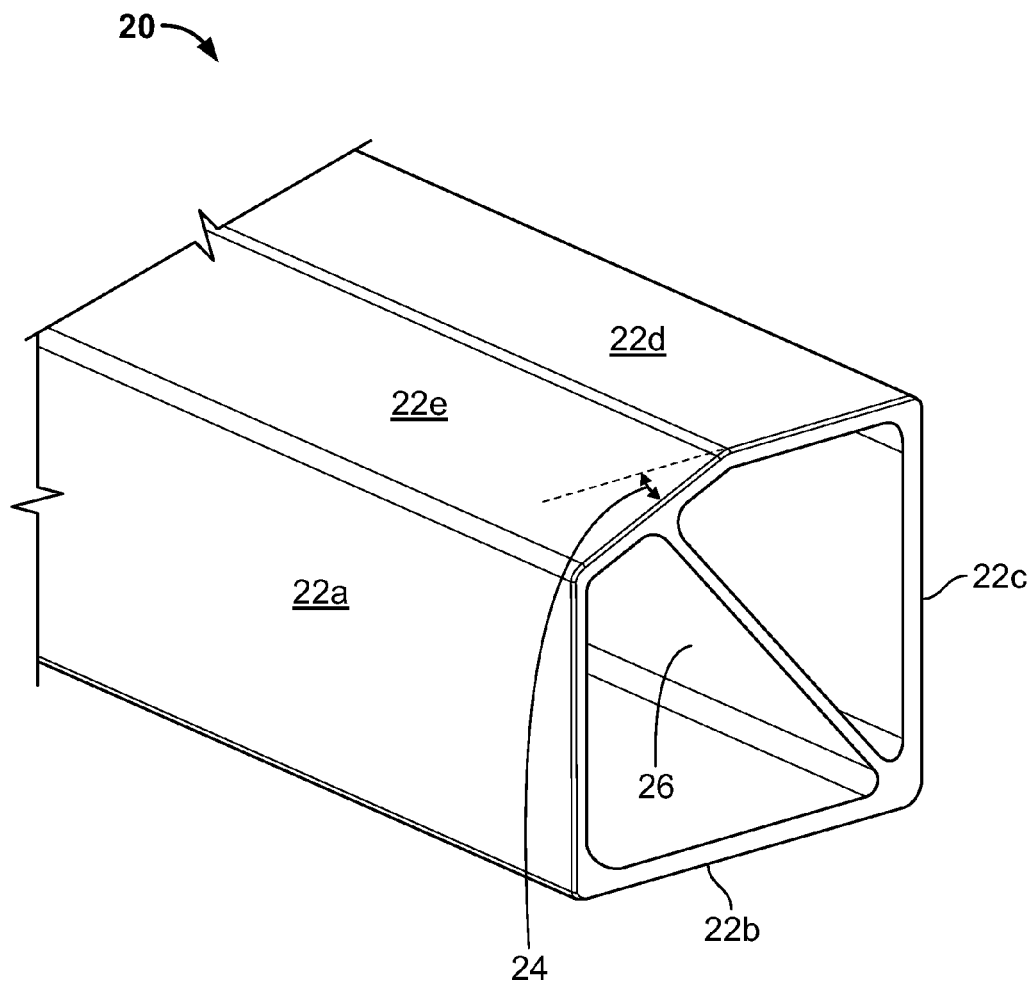
FIG. 3 is an enlarged partial perspective view of an end portion of the cargo dunnage device of FIG. 2.

A first embodiment of the cargo dunnage device of the present invention is indicated in general at 20 in FIGS. 2 and 3. As illustrated in FIGS. 2 and 3, the dunnage device preferably features an elongated tubular body, indicated in general at 21 in FIG. 2, having five sides 22a-22e. As illustrated in FIG. 3, side 22e preferably forms an angle with side 22d (indicated by arrows 24) of approximately twenty seven degrees (to match a standard coil radius). Of course alternative angles may be used for angle 24. The dunnage device features a tubular construction so that an interior space is formed. Transverse wall 26 is positioned within the interior space and increases the strength or crush resistance of the dunnage device.

The dunnage device 20 of FIGS. 2 and 3 may be substituted for traditional timber dunnage devices in cargo carrying and securement applications (see FIG. 1, for example) and may be 50% lighter than oak timbers that are currently in use. As explained below, the dunnage devices 20 may be locked onto a rack on the main beam of the cargo deck when not in use and may be stronger, lighter, re-usable and consistent.

The dunnage device is preferably made from aluminum or metal to provide a weight savings over timber dunnage devices. Other materials, such as plastics, composites or any other material that is strong and durable and rigid or semi-rigid may be used. The dunnage device is preferably covered with polyurea or other material to eliminate the need for a friction mat. The dunnage device may feature an extruded construction. Alternatively, welding may be used to attach at least some of the sides and walls together. Other methods of attaching the sides and walls together may also be used.

Figure 4:
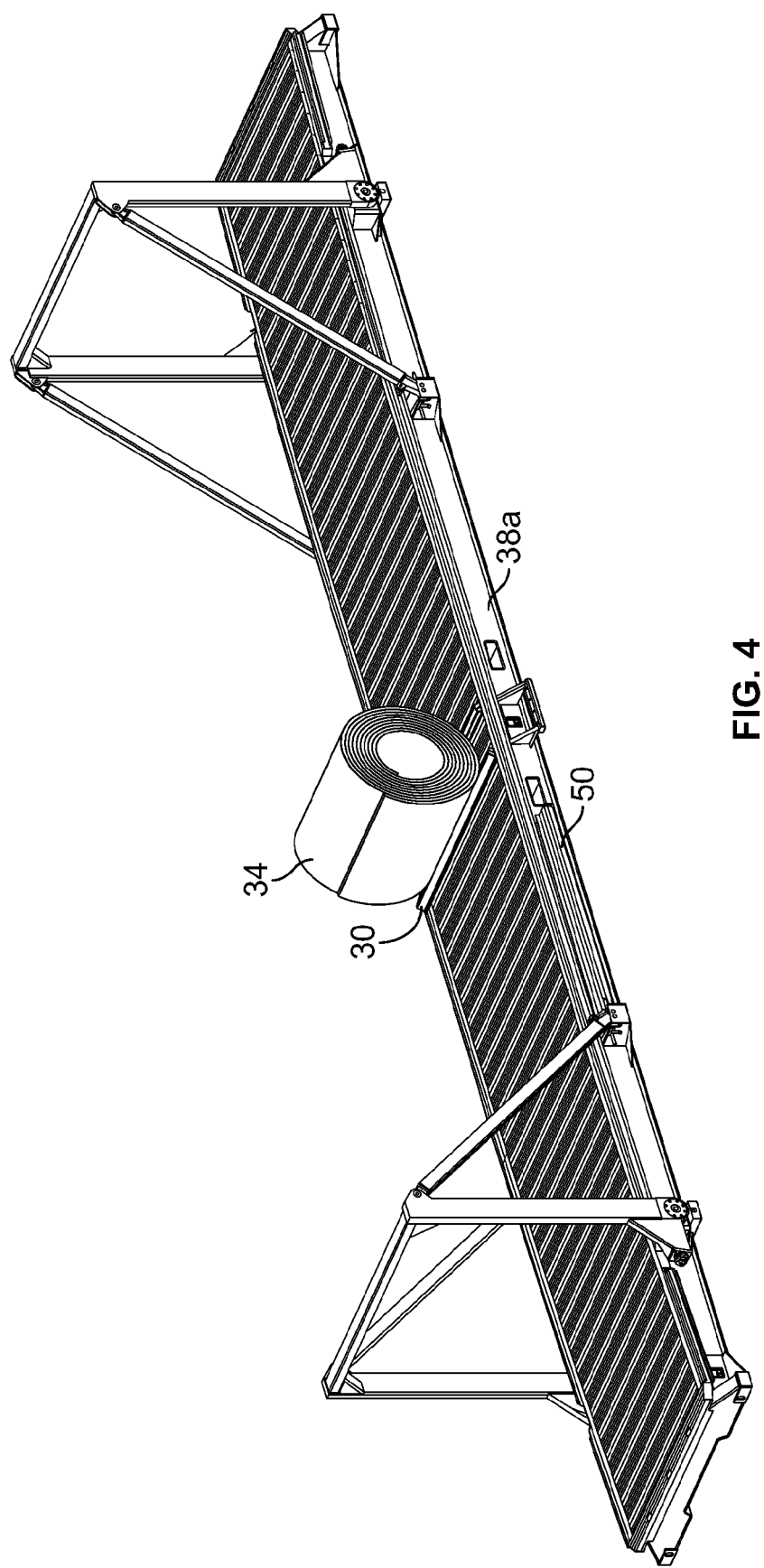
FIG. 4 is a perspective view of a second embodiment of the cargo dunnage device of the present invention in use on an intermodal flat rack.
Figure 5:
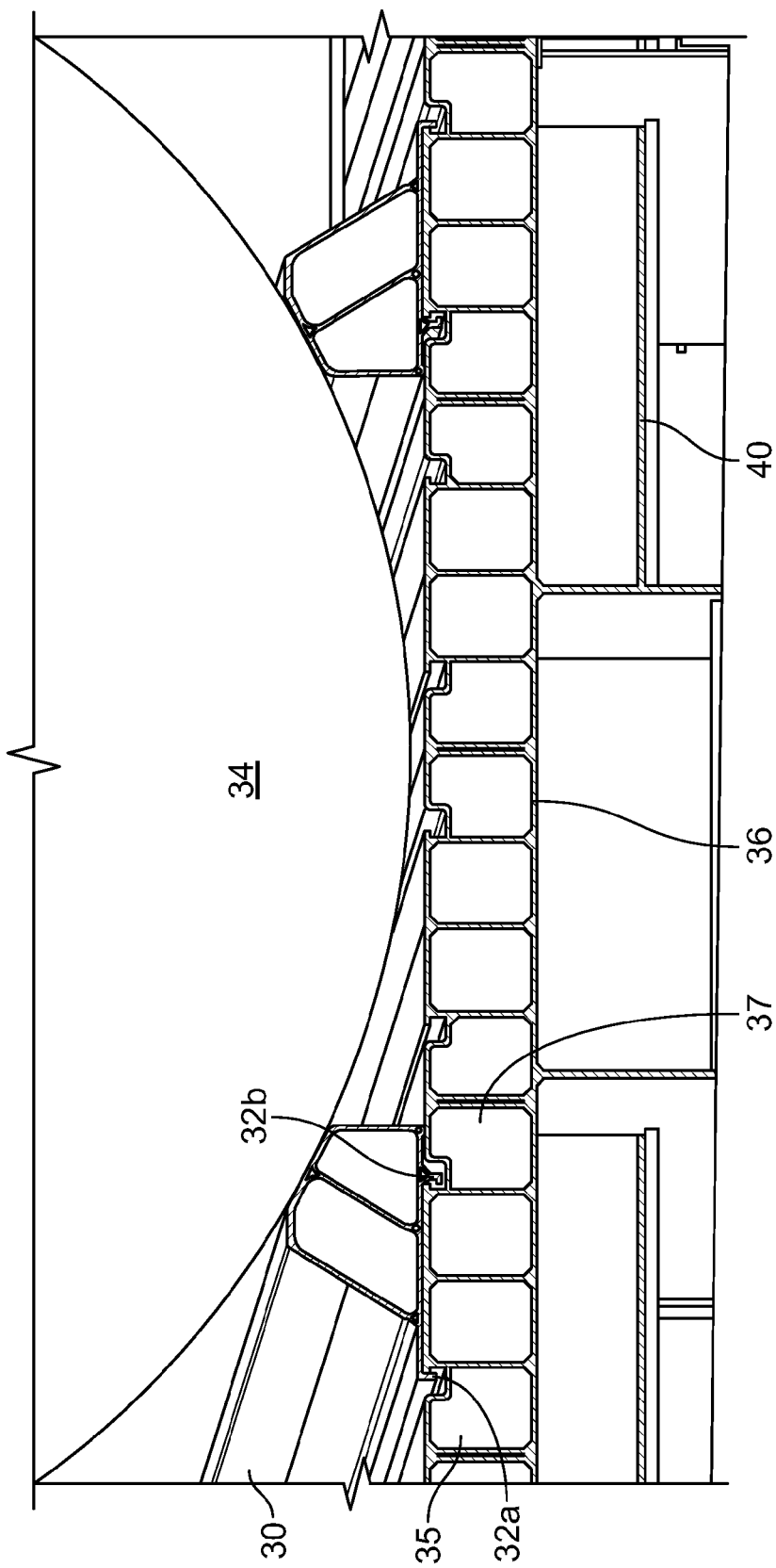
FIG. 5 is an enlarged cross-sectional view of a portion of the cargo deck and dunnage device of FIG. 4.
Figure 6:
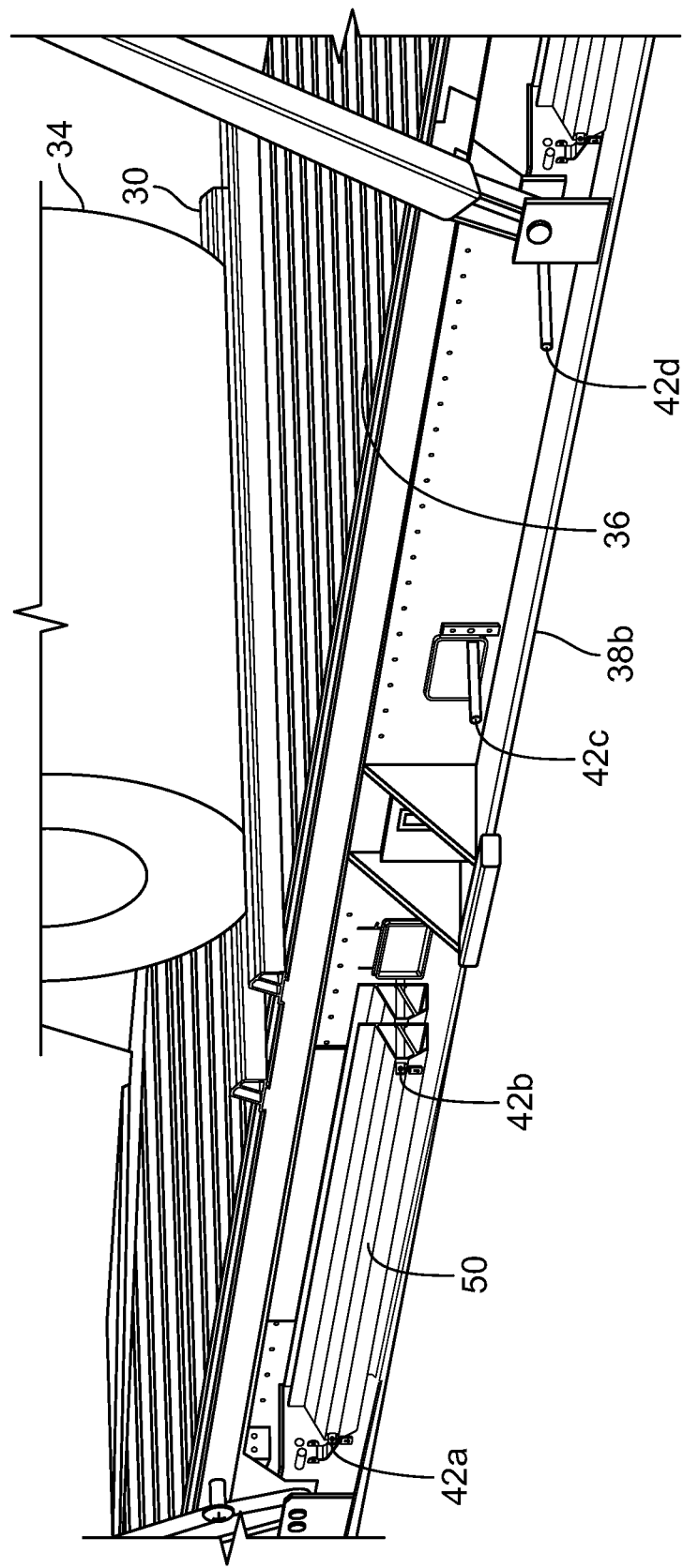
FIG. 6 is a partial perspective view of a third embodiment of the cargo dunnage device of the present invention being stored on an intermodal flat rack when not in use.

A second, alternative embodiment of the cargo dunnage device is illustrated at 30 in FIGS. 4-6. As illustrated in FIG. 5, the dunnage device 30 features downward extending and generally vertical hook portion 32a and downward extending generally vertical and inward extending generally horizontal hook portion 32b. The dunnage device 30 being used to secure a load, such as a roll of material 34, to a cargo deck 36 is illustrated in FIGS. 4-6. As an example only, the cargo deck may be that of a trailer or an intermodal flat rack, such as the one illustrated in FIG. 4, which is the subject of commonly assigned U.S. patent application Ser. No. 14/076,725, the contents of which are hereby incorporated by reference.

As illustrated in FIGS. 4-6, the cargo deck 36 may feature a pair of main beams 38a and 38b which are joined by a number of cross beams, such as cross beam 40. The main beams and cross beams are preferably constructed from steel, although aluminum may be used for some of the beams as a lighter alternative. As best shown in FIG. 5, the cargo deck 36 is made up of a number of hollow plank members that are preferably aluminum and joined or formed in a side-by-side configuration to form a unitary aluminum construction, such as that of the REVOLUTION flatbed trailer from the Fontaine Trailer Company of Haleyville, Ala. The cargo deck is preferably of the type having channels for receiving sliding load securing brackets, as illustrated in commonly assigned U.S. Pat. Nos. 7,571,953 and 8,057,143, the contents of which are hereby incorporated by reference. As illustrated in FIG. 5, the inward-facing hook portions 32a and 32b of the dunnage devices 30 engage the channels 35 and 37 of the cargo deck 36.

As a result, by properly positioning dunnage devices 30 on both sides of load 34, the load may be secured to the cargo deck 36.

Figure 7:
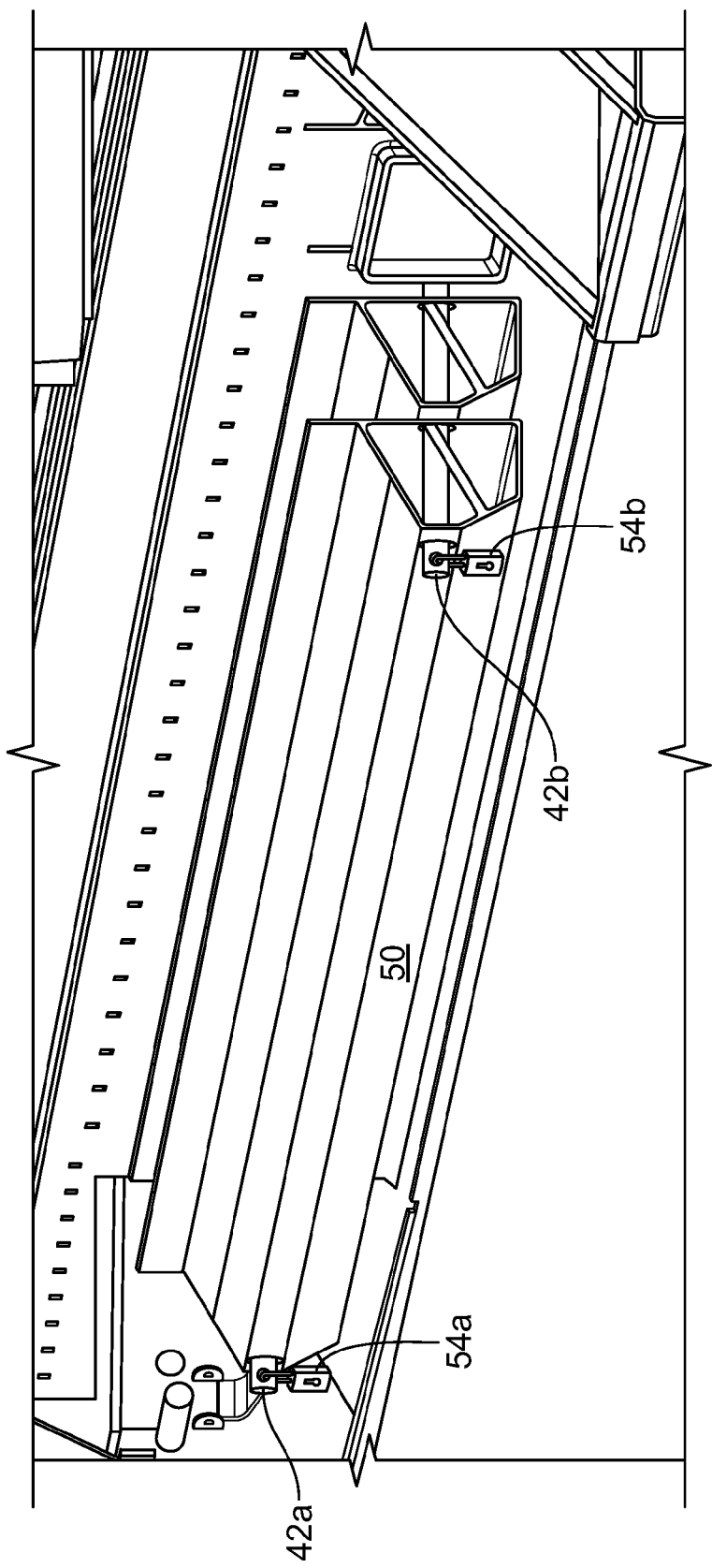
FIG. 7 is an enlarged partial perspective view of the cargo dunnage device and the intermodal flat rack of FIG. 6.

As illustrated in FIG. 6, rods 42a-42d are preferably attached to main beam 38b to provide storage for dunnage devices, such as the third embodiment indicated at 50 in FIGS. 4, 6 and 7, when the dunnage devices are not in use. More specifically, as illustrated in FIG. 7, the dunnage devices 50 each have openings sized to receive the rods 42a-42d. As illustrated in FIG. 7, apertures are formed on the end of the rods (as illustrated for rods 42a and 42b) so that the dunnage devices 50 may be locked in the storage position by conventional locks 54a and 54b. Of course alternative types of locks known in the art may be used.

Figure 8:
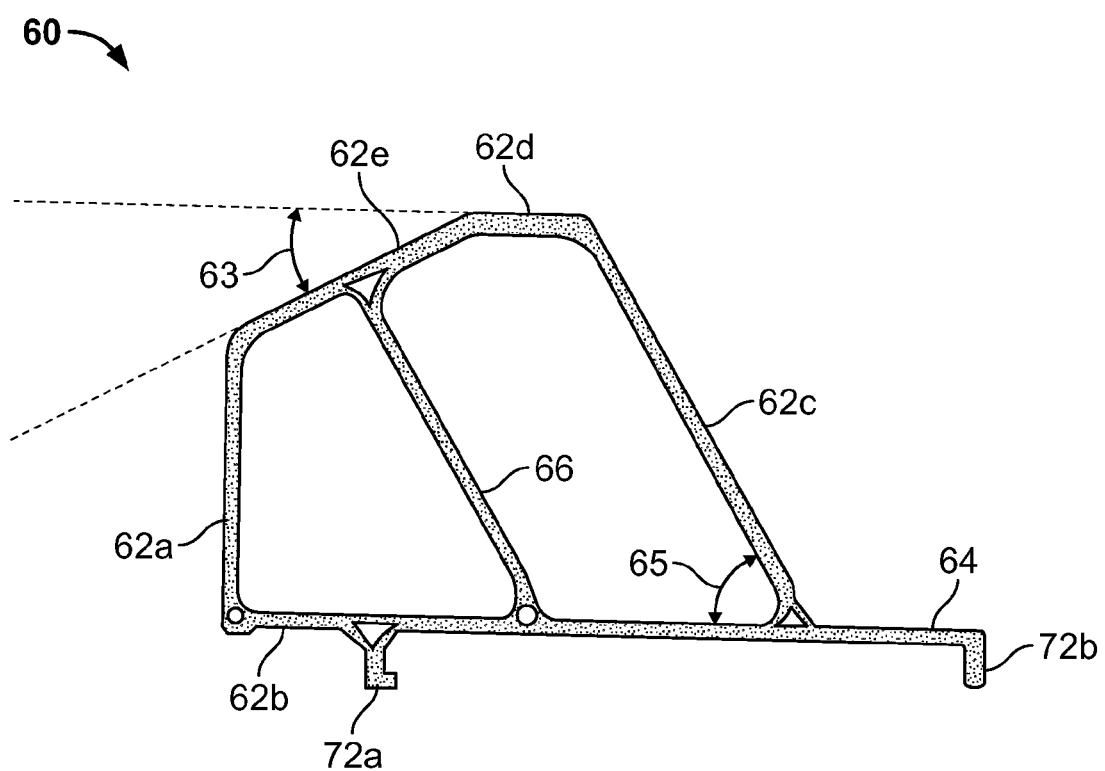
FIG. 8 is a side elevational view of a fourth embodiment of the cargo dunnage device of the present invention.

A fourth embodiment of the dunnage device of the present invention is indicated in general at 60 in FIG. 8. As illustrated in FIG. 8, the dunnage device has an elongated body that features five sides 62a-62e. As illustrated in FIG. 8, side 62e preferably forms an angle with side 62d (indicated by arrows 63) of approximately twenty seven degrees (to match a standard coil radius). In addition, side 62c forms an angle with side 62b (indicated by arrows 65) that may also be approximately twenty seven degrees. Side 62b also includes a flange portion 64. The dunnage device features a tubular construction so that an interior space is formed. Transverse wall 66 is positioned within the interior space and increases the strength or crush resistance of the dunnage device. Transverse wall 66 is generally parallel with side 62*c*, as illustrated in FIG. 8.

As also illustrated in FIG. 8, the dunnage device 60 features downward and inward extending hook portion 72*a* and downward extending hook portion 72*b*. As a result, dunnage device 60 may be used to engage the floor of a cargo deck in a manner similar to that illustrated for dunnage device 30 in FIGS. 4-6 so as to secure a load, such as a roll of material 34, to the cargo deck 36.

While the preferred embodiments of the invention have been shown and described, it will be apparent to those skilled in the art that changes and modifications may be made therein without departing from the spirit of the invention, the scope of which is defined by the following claims.

What is claimed is:

1. A dunnage device for securing a load to a cargo deck comprising:
   a. a tubular body having an interior space, said tubular body having a first side wall, a base wall, a second side wall, a top wall and a load engagement wall, each of said first and second side walls, base wall, top wall and load engagement wall featuring an outer side defining an external surface of the tubular body and wherein the tubular body is elongated in a direction along an axis running parallel to each of said first and second side walls, base wall, top wall and load engagement wall;
   b. a transverse wall positioned within the interior space of the tubular body and having a first edge abutting an interior surface of the load engagement wall;
   c. said base wall adapted to be positioned on the cargo deck;
   d. said first side wall attached between the base wall and the load engagement wall and said second side wall attached between the top wall and the base wall and said top wall attached between the load engagement wall and the second side wall, said load engagement wall oriented at an angle with respect to the base wall.

2. The dunnage device of claim 1 wherein the load engagement wall is oriented at an angle of approximately twenty seven degrees with respect to the base wall.

3. The dunnage device of claim 1 wherein the tubular body is coated with polyurea.

4. The dunnage device of claim 1 wherein the transverse wall is welded to the tubular body.

5. The dunnage device of claim 4 wherein at least two of the walls of the tubular body are welded to one another.

6. The dunnage device of claim 1 wherein the tubular body is extruded.

7. The dunnage device of claim 1 wherein the transverse wall includes a second edge abutting the base wall.

8. The dunnage device of claim 1 wherein the first side wall and the second side wall are parallel to each other.

9. The dunnage device of claim 1 wherein the top wall is parallel with the base wall.

\* \* \* \* \*